3,105,832
9-HALO-4,6-PREGNADIENES
Josef Fried, Princeton, N.J., assignor to Olin Mathieson
Chemical Corporation, New York, N.Y., a corporation
of Virginia
No Drawing. Filed June 9, 1961, Ser. No. 115,907
16 Claims. (Cl. 260—239.55)

This application is a continuation-in-part of my applications, Serial No. 489,769, filed February 21, 1955, and Serial No. 516,333, filed June 17, 1955, now U.S. Patent No. 3,000,915.

This invention relates to the synthesis of valuable steroids.

One object of this invention is the provision of an advantageous process of preparing steroids of the 4,6-pregnadiene (including pregnatriene) series, having a 9α-halo group and an 11β-hydroxy or 11-keto group. Another object of this invention is the provision of steroids of the 4,6-pregnadiene (including pregnatriene) series, having a 9α-halo group and an 11β-hydroxy or 11-keto group, which compounds are useful either for their own physiological action or as intermediates in the preparation of physioligically-active derivatives.

The preferred 9α-halo compounds of this invention are those which are comprehended by the general formula:

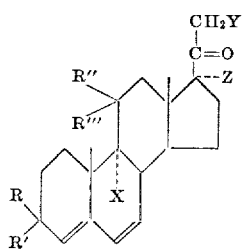

wherein R is hydrogen, R' is hydroxy or together R and R' is a keto or ketalized keto group (preferably the free keto group), R'' is hydrogen, R''' is β-hydroxy, or together R'' and R''' is a keto group, X is an α-halogen group, Z is hydrogen or α-hydroxy, and Y is hydrogen, hydroxy or acyloxy (preferably the acyloxy radical of a hydrocarbon carboxylic acid of less than ten carbon atoms). Suitable acyloxy radicals are those formed with lower alkanoic acids, such as acetic, propionic, heptanoic and caprylic acid; monocyclic aryl carboxylic acids, such as benzoic and toluic acid; monocyclic aryl lower alkanoic acids, such as phenacetic and β-phenylpropionic acid; lower alkenoic acids; cycloalkane carboxylic acids; and cycloalkene carboxylic acids.

The steroids of this invention, which are unsaturated in the 4,5 and 6,7 positions and have a 9α-halo group and an 11β-hydroxy or 11-keto group, are physiologically-active compounds which possess glucocorticoid as well as mineralocorticoid activity. Thus, the new steroids of this invention can be administered instead of, and in the same manner as, cortisone or hydrocortisone in the treatment of rheumatoid arthritis and dermatomyositis, or in the same manner as desoxycorticosterone in the treatment of Addison's disease or adrenal insufficiencies. The dosage for such administration is of course dependent on the relative activity of the compound; thus, where the steroid derivative has thirty times the activity of cortisone, the dosage of the former to be employed should be one-thirtieth of the employed dosage of the latter.

Representative 4,6-pregnadienes of this invention include, inter alia, the 9α-halo-Δ$^{4,6}$-pregnadiene-11β-ol-3,20-diones (e.g. 9α-fluoro-Δ$^{4,6}$-pregnadiene-11β-ol-3,20-dione and 9α-chloro-Δ$^{4,6}$-pregnadiene-11β-ol-3,20-dione), the 9α-halo-Δ$^{4,6}$-pregnadiene-3,11-20-triones (e.g., 9α-fluoro-Δ$^{4,6}$-pregnadiene-3,11,20-trione and 9α-chloro-Δ$^{4,6}$-pregnadiene-3,11,20-trione), the 9α-halo-Δ$^{4,6}$-pregnadiene-11β,17α-diol-3,20-diones (e.g., 9α-fluoro-Δ$^{4,6}$-pregnadiene-11β,17α-diol-3,20-dione and 9α-chloro-Δ$^{4,6}$-pregnadiene-11β,17α-diol-3,20-dione), the 9α-halo-Δ$^{4,6}$-pregnadiene-17α-ol-3,11,20-triones (e.g., 9α-fluoro-Δ$^{4,6}$-pregnadiene-17α-ol-3,11,20-trione and 9α-chloro-Δ$^{4,6}$-pregnadiene-17α-ol-3,11,20-trione), the 9α-halo-Δ$^{4,6}$-pregnadiene-11β,21-diol-3,20-diones (e.g., 9α-fluoro-Δ$^{4,6}$-pregnadiene-11β,21-diol-3,20-dione and 9α-chloro-Δ$^{4,6}$-pregnadiene-11β,21-diol-3,20-dione) and the 21-esters thereof (e.g., the 21-lower alkanoates such as the 21-acetate and 21-propionate), the 9α-halo-Δ$^{4,6}$-pregnadiene-21-ol-3,11,20-triones (e.g., 9α-fluoro-Δ$^{4,6}$-pregnadiene-21-ol-3,11,20-trione and 9α-chloro-Δ$^{4,6}$-pregnadiene-21-ol-3,11-20-trione) and the 21-esters thereof, the 9α-halo-Δ$^{4,6}$-pregnadiene-11β,17α-21-triol-3,20-diones (i.e., 9α-fluoro-Δ$^{4,6}$-pregnadiene-11β,17α,21-triol - 3,20 - dione, 9α - chloro - Δ$^{4,6}$ - pregnadiene - 11β, 17α - 21 - triol - 3,20 - dione, 9α - bromo - Δ$^{4,6}$ - pregnadiene-11β,17α-21-triol-3,20-dione, and 9α-iodo-Δ$^{4,6}$-pregnadiene-11β,17α,21-triol-3,20-dione) and the 21-esters thereof (e.g., 21-lower-alkanoyl esters), and the 9α-halo-Δ$^{4,6}$ - pregnadiene - 17α - 21 - diol - 3,11,20 - triones (e.g., 9α - fluoro - Δ$^{4,6}$ - pregnadiene - 17α,21 - diol - 3,11,20-trione and 9α-chloro-Δ$^{4,6}$-pregnadiene-17α,21-diol-3,11,20-trione) and the 21-esters thereof (e.g., 21-lower alkanoyl esters).

The steroids of this invention can be prepared by a number of different processes. A particularly advantageous process for forming the steroids of this invention consists in using one of the 9α-halo-11β-hydroxy or 11-keto steroids disclosed in U.S. Patent No. 2,852,511 as a starting material. Representative of these steroids are the 9α-halo-11β-hydroxyprogesterones, the 9α-halo-11-ketoprogesterones, the 9α-halo-11β,17α-dihydroxyprogesterones, the 9α-halo-17α-hydroxy-11-ketoprogesterones, the 21-esters of 9α-halocorticosterone (e.g., the 21-lower alkanoyl esters, such as the 21-acetate), the 21-ester of 9α-halo-11-dehydrocorticosterone, the 21-esters of 9α-halohydrocortisone, and the 9α-halocortisones, wherein the halogen has an atomic number no higher than 35, preferably no higher than 17. One of these representative steroids is hydrogenated to saturate the 4,5 double bond to form the corresponding allopregnane derivative. This step in the process may be carried out by means of hydrogen in the presence of a palladium catalyst with or without a carrier, such as barium sulfate, charcoal, calcium carbonate, etc. Other known hydrogenation procedures can, of course, be used instead. If A 9α-halo-11β-hydroxy or 11-keto allopregnane is used initially, the first step in the process can, of course, be dispensed with and the allopregnene can be used directly in the next step of the process.

The allopregnane containing a 9α-halo group, wherein the halogen has an atomic number no higher than 35

(preferably no higher than 17) and an 11β-hydroxy or 11-keto group is then treated with two moles of bromine per mole of steroid in a suitable organic solvent such as an acid (e.g., a lower alkanoic acid, such as acetic acid) to yield a 2,4-dibromo derivative as the major product, the preferred compounds being those of the general formula

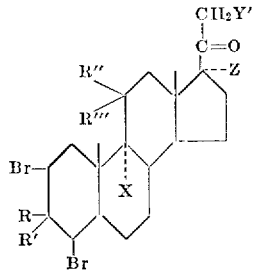

wherein Y' is hydrogen or acyloxy (e.g., a lower alkanoyloxy, such as acetoxy), and R, R', R", R''', and X and Z are as hereinbefore defined.

The brominated allopregnanes are then dehydrobrominated to yield a mixture of 1,4-pregnadiene and 4,6-pregnadiene derivatives, which may be separated by chromatography, as more fully detailed in the examples following. The dehydrobromination may be done, inter alia, by heating the steroid in the presence of an organic base, such as a lower alkylated pyridine (e.g., collidine), with or without a lithium halide salt, or by treating the steroid with a lithium halide (e.g., lithium chloride) in an organic solvent, such as a lower fatty acid amide (e.g., dimethyl formamide) to form the unsaturated derivative.

The 9α-halo-11β-hydroxy steroids formed by the preferred process of this invention can then either be oxidized with chromic oxide in the known manner to produce the corresponding 9α-halo-11-keto derivatives, or they can be reacted with a dehydrohalogenating agent, when the halogen atom is bromine or chlorine, to form the 9β,11β-oxido derivative, as more fully disclosed hereinafter. Furthermore, if a 21-acyloxy steroid is used as the reactant in the above steps, the esterifying group in the 21-position can be hydrolyzed by treating the steroid with an alkali metal salt of carbonic acid (e.g., potassium bicarbonate or potassium carbonate) for example, in an organic solvent such as an alcohol (e.g., methanol) to form the free 21-ol.

Those steroids of this invention which contain a 21-hydroxyl group are also useful as intermediates in the preparation of corresponding steroid derivatives unsubstituted in the 21-position. This conversion is effected by converting the 21-hydroxy steroid, having a 9α-fluoro (or chloro) and an 11β-hydroxy (or 11-keto) substituent, into the corresponding 21-alkanesulfonyloxy derivative thereof and converting the latter into the corresponding 21-unsubstituted derivative, either directly or through the 21-iodide derivative.

The preferred compounds preparable by this process are those which are comprehended by the general formula

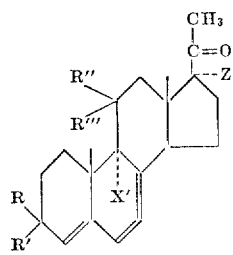

wherein R, R', R", R''' and Z are as hereinbefore defined and X' is α-fluoro or α-chloro.

Representative steroids preparable by this process of the invention include: 9α-fluoro-Δ⁴,⁶-pregnadiene-11β, 17α - diol - 3,20 - dione; 9α - chloro - Δ⁴,⁶ - pregnadiene-11β,17α - diol - 3,20 - dione; 9α - fluoro - Δ⁴,⁶ - pregnadiene - 17α - ol - 3,11,20 - trione; 9α - chloro - Δ⁴,⁶ - pregnadiene - 17α-ol-3,11,20 - trione; 9α - fluoro - Δ⁴,⁶ - pregnadiene - 11β,ol - 3,20 - dione; 9α - chloro - Δ⁴,⁶ - pregnadiene - 11β - ol - 3,20 - dione; 9α - fluoro - Δ⁴,⁶ - pregnadiene-3,11,20-trione; and 9α-chloro-Δ⁴,⁶-pregnadiene-3,11,20-trione.

To prepare these 9α-halo compounds, a steroid of the general formula

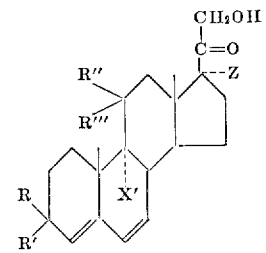

wherein R, R', R", R''', X' and Z are as hereinbefore defined, is reacted with an alkanesulfonyl halide, alkanesulfonyl chlorides being preferred, but other halides such as bromides and iodides being utilizable. Although any alkanesulfonyl chloride may be used, the alkane group is preferably a lower alkane, methanesulfonyl chloride (mesyl chloride) being particularly preferred. The reaction is carried out by intermixing the steroid and sulfonyl halide under substantially anhydrous conditions and preferably in the cold (e.g., at a temperature less than about 20° C.), in the presence of pyridine or other organic base.

The reaction results in the production of 21-alkanesulfonyloxy compounds of the general formula

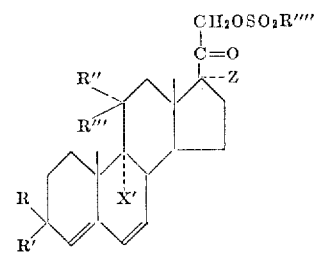

wherein R'''' is alkyl (preferably lower alkyl) and R, R', R", R''', X' and Z are as hereinbefore defined.

The 21-alkanesulfonyloxy intermediates are then reacted with a metal iodide (such as an alkali metal iodide, and particularly sodium iodide) in an organic solvent. The reaction is preferably conducted at an elevated temperature (e.g., at reflux). The nature of the product will depend on the organic solvent selected. If an acidic solvent, such as a lower alkanoic acid (particularly glacial acetic acid) is chosen, the 21-unsubstituted final products of this invention are obtained directly. If, however, a neutral solvent such as an alcohol or a ketone (particularly acetone) is selected, then a 21-iodated intermediate is produced. Such 21-iodo intermediate can then be converted to its 21-unsubstituted derivative, either in situ or in a second step, by reacting (preferably heating) the former with an alkali metal iodide in an acidic solvent or with a metal bisulfite (such as an alkali metal bisulfite, particularly sodium bisulfite) in an inert solvent, such as an aqueous organic solvent (e.g., water-dioxane), or with an electropositive reducing metal (such as zinc dust) in an acidic solvent to prepare the final products of this invention.

For the purpose of illustrating the processes of this invention, reference is made to the following schematic analysis employing the 21-acetate esters of 9α-halohydrocortisone and 9α-halocortisone as starting materials:
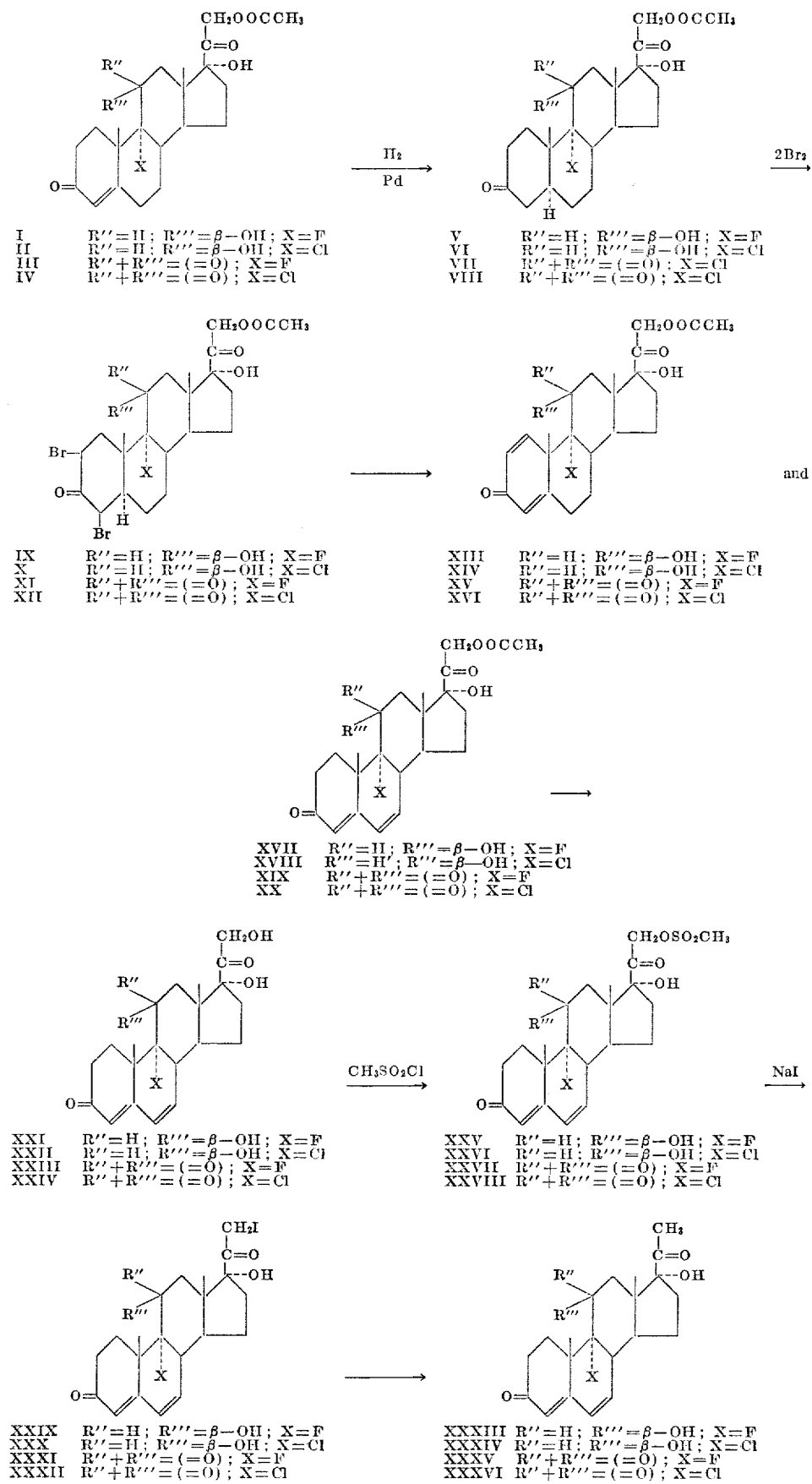

The following examples are illustrative of the invention (all temperatures being in centigrade):

EXAMPLE 1

*9α-Fluoro-Δ⁴,⁶-Pregnadiene-11β,17α,21-Triol-3,20-Dione 21-Acetate (XVII)*

(a) PREPARATION OF 9α-FLUOROALLOPREGNANE-11β,17α,21-TRIOL-3,20-DIONE 21-ACETATE (V)

A solution of 2.5 grams of 9α-fluorohydrocortisone acetate in 75 ml. of 95% alcohol is agitated in an atmosphere of hydrogen at room temperature and ordinary pressure in the presence of 500 mg. of 5% palladium on barium sulfate catalyst. After the absorption of 160.5 ml. of hydrogen, the reduction comes to a standstill. The catalyst is filtered off and the 9α-fluoroallopregnane-11β,17α,21-triol-3,20-dione 21-acetate crystallized by successive concentrations of the filtrate. A total of about 2.17 grams of material approximately (87% of theory) is obtained, having the following properties: M.P., about 236–237°; $[\alpha]_D^{23} +66°$ (c., 0.96 in acetone);

$\lambda_{max.}^{Nujol}$ 2.82μ, 2.97μ (OH), 5.75μ (21-acetyl), 5.81μ (21-keto) 5.97μ (3-keto); $\lambda_{max.}^{alc.}$ 293μ ($\epsilon = 110$).

*Anal.*—Calcd. for $C_{23}H_{33}O_6F$ (424.49): C, 65.54; H, 7.87. Found: C, 65.34; H, 7.69.

Essentially the same result is obtained when the hydrogenation is conducted in ethyl acetate. 9α-fluoroallopregnane-11β,17α,21-triol-3,20-dione 21-acetate crystallizes with ethyl acetate of crystallization, and it is desirable in this case to recrystallize from alcohol in order to obtain it free of the ethyl acetate. Other 21-esters at 9α-fluorohydrocortisone such as the propionate valerate, or caprylate, can, of course, be substituted for the 21-acetate in Example 1.

Similarly, if 9α-chlorohydrocortisone acetate (II), 9α-fluorocortisone acetate (III), or 9α-chlorocortisone acetate (IV) is substituted for 9α-fluorohydrocortisone acetate in the procedure of Example 1, 9α-chloroallopregnane-11β,17α,21-triol-3,20-dione 21-acetate (VI), 9α-fluoroallopregnane-17α,21-diol-3,11,20-trione 21-acetate (VII), and 9α-chloroallopregnane-17α,21-diol-3,11,20-trione 21-acetate (VIII) are formed, respectively.

(b) PREPARATION OF 9α-FLUORO-Δ⁴,⁶-PREGNADIENE-11β,17α,21-TRIOL-3,20-DIONE 21-ACETATE

To a solution of 2.120 grams of 9α-fluoroallopregnane-11β,17α,21-triol-3,20-dione 21-acetate in 100 ml. of glacial acetic acid is added 0.05 ml. of 1.3 N hydrobromic acid in acetic acid, and then dropwise with stirring a solution of 1.52 g. of bromine in 19 ml. of acetic acid. After standing at room temperature for one hour, 1.1 g. of potassium acetate is added, and the mixture concentrated in vacuo to small volume. After the addition of water, the suspension is extracted with chloroform and the chloroform solution washed with water, sodium bicarbonate solution and again with water. Removal of the solvent in vacuo leaves the crude 2,4-dibromo-9α-fluoroallopregnane-11β,17α,21-triol-3,20-dione 21-acetate (IX) as an amorphous residue, which is debrominated with collidine without further purification. For this purpose it is dissolved in 25 ml. of collidine and refluxed for 30 minutes in an atmosphere of nitrogen. The mixture is diluted with chloroform and the collidine removed by extraction with dilute sulfuric acid. After washing with sodium bicarbonate solution and water, the chloroform solution is dried over sodium sulfate and evaporated to dryness in vacuo. The residue is dissolved in 16 ml. of chloroform and the resulting solution diluted with 48 ml. of benzene. The mixture is centrifuged and chromatographed on 30 g. of sulfuric acid-washed alumina. Elution of the column with 1 part of chloroform and 3 parts of benzene produces a mixture of by-products, which is followed by 9α-fluoro-Δ⁴,⁶-pregnadiene-11β,17α,21-triol-3,20-dione 21-acetate (XVII) when the eluting fluid is changed to a mixture of equal parts of chloroform and benzene. Recrystallization of the combined fractions from ethyl acetate affords the pure substance having the following properties: M.P. about 209–211°; $[\alpha]_D^{23} +139°$ (c., 0.76 in CHCl₃);

$\lambda_{max.}^{alc.}$ 281 mμ ($\epsilon = 23,000$); $\lambda_{max.}^{Nujol}$ 2.86μ, 3.02μ (OH), 5.76μ (acetyl), 5.80μ (20-keto), 6.07μ, 6.12μ, 6.20μ (Δ⁴,⁶-3-ketone).

*Analysis.*—Calcd. for $C_{23}H_{29}O_6F$ (420.46): C, 65.70; H, 6.95. Found: C, 65.75; H, 7.04.

9α-fluoro-Δ⁴,⁶-pregnadiene-11β,17α,21-triol-3,20-dione 21-acetate possesses about 7 times the activity of cortisone acetate in the rat liver glycogen test.

Continued elution of the chromatographic column with a mixture of 3 parts of chloroform and 1 part of benzene affords 9α-fluoro-Δ¹,⁴-pregnadiene-11β,17α,21-triol-3,20-dione 21-acetate (XIII), which after crystallization from acetone-hexane has the following properties: M.P. about 241–244°; $[\alpha]_D^{23} +99°$ (c., 0.34 in acetone);

$\lambda_{max.}^{alc.}$ 238 mμ ($\epsilon = 14,700$); $\lambda_{max.}^{Nujol}$ 2.93μ, 3.02μ (OH), 5.76μ, (acetyl), 5.85μ (20-keto), 6.02μ, 6.19μ, 6.26μ (Δ¹,⁴-3-keto).

*Analysis.*—Calcd. for $C_{23}H_{29}O_6F$ (420.46): C, 65.70; H, 6.95. Found: C, 65.88; H, 7.20.

9α-fluoro-Δ¹,⁴-pregnadiene-11β,17α,21-triol-3,20-dione 21-acetate possesses about 30 times the activity of cortisone acetate in the rat liver glycogen assay. 9α-fluoro-Δ¹,⁴-pregnadiene-11β,17α,21-triol-3,20-dione 21-acetate and its Δ⁴,⁶-isomer can also be produced by the procedure of the following example:

EXAMPLE 2

A solution of 690 mg. of 2,4-dibromo-9α-fluoroallopregnane-11β,17α,21-triol-3,20-dione 21-acetate (IX) and 255 mg. of lithium chloride in 5 ml. of dimethylformamide is heated on the steam cone for 2 hours in an atmosphere of nitrogen. The mixture is diluted with water and the resulting suspension extracted with chloroform. The chloroform solution is washed with water, sodium bicarbonate solution and again with water, dried over sodium sulfate and evaporated to dryness in vacuo. The resulting residue, on chromatography as described in Example 1(b), furnishes the desired substances in pure form.

Similarly, if 9α-chloroallopregnane-11β,17α,21-triol-3,20-dione 21-acetate (VI), 9α-fluoroallopregnane-17α,21-diol-3,11,20-trione 21-acetate (VII), or 9α-chloroallopregnane-17α-21-diol-3,11,20-trione 21-acetate (VIII) is substituted for 9α-fluoroallopregnane-11β,17α,21-triol-3,20-dione 21-acetate in the process of Example 1(b), the intermediates 2,4-dibromo-9α-chloroallopregnane-11β,17α,21-triol-3,20-dione 21-acetate (X), 2,4-dibromo-9α-fluoroallopregnane-17α,21-diol-3,11,20-trione 21-acetate (XI), and 2,4-dibromo-9α-chloroallopregnane-17α,21-diol-3,11,20-trione 21-acetate (XII) are obtained, respectively. These dibrominated intermediates can then be converted to a mixture of their respective Δ¹,⁴-pregnadienes (XIV to XVI) and Δ⁴,⁶-pregnadienes (XVIII to XX) by the procedures of Examples 1(b) and 2. The mixture is then separated chromatographically by the method disclosed in Example 1(b).

Furthermore, if another 9α-halo steroid of the pregnane series is substituted for the 9α-halohydrocortisones (acetate) and 9α-halocortisones (acetate) employed as described hereinbefore, the corresponding Δ¹,⁴ and Δ⁴,⁶ derivatives are obtained. Thus, 9α-fluorocorticosterone acetate yields 9α-fluoro-Δ¹,⁴-pregnadiene-11β,21-diol-3,20-dione 21-acetate and 9α-fluoro-Δ⁴,⁶-pregnadiene-11β,21-diol-3,20-dione 21-acetate; 9α-chlorocorticosterone acetate yields 9α-chloro-Δ¹,⁴-pregnadiene-11β,21-diol-3,20-dione 21-acetate and 9α-chloro-Δ⁴,⁶-pregnadiene-11β,21-diol-3,20-dione 21-acetate; 9α-fluoro-11-dehydrocorticosterone acetate yields 9α-fluoro-Δ¹,⁴-pregnadiene-21-ol-3,11,20- trione 21-acetate and 9α-fluoro-Δ$^{4,6}$-pregnadiene-21-ol-3,11,20-trione 21-acetate; 9α-chloro-11-dehydrocorticosterone acetate yields 9α-chloro-Δ$^{1,4}$-pregnadiene-21-ol-3,11,20-trione 21-acetate and 9α-chloro-Δ$^{4,6}$-pregnadiene-21-ol-3,11,20-trione 21-acetate; 9α-fluoro-11β,17α-dihydroxyprogesterone yields 9α-fluoro-Δ$^{1,4}$-pregnadiene-11β,17α-diol-3,20-dione and 9α-fluoro-Δ$^{4,6}$-pregnadiene-11β,17α-diol-3,20-dione; 9α-fluoro-11β-hydroxyprogesterone yields 9α-fluoro-Δ$^{1,4}$-pregnadiene-11β,ol-3,20-dione and 9α-fluoro-Δ$^{4,6}$-pregnadiene-11β-ol-3,20-dione; 9α-chloro-11β-hydroxyprogesterone yields 9α-chloro-Δ$^{1,4}$-pregnadiene-11β-ol-3,20-dione and 9α-chloro-Δ$^{4,6}$-pregnadiene-11β,ol-3,20-dione; and 9α-fluoro-11-ketoprogesterone yields 9α-fluoro-Δ$^{1,4}$-pregnadiene-3,11,20-trione and 9α-fluoro-Δ$^{4,6}$-pregnadiene-3,11,20-trione.

The 21-esterifying group may be hydrolyzed by treating the steroid with an alkali metal salt of a weak acid (e.g. potassium carbonate or potassium bicarbonate) in an organic solvent (e.g. methanol) to yield the free 21-ol. By this method the 9α-halo-Δ$^{4,6}$-pregnadiene-11β,17α,21-triol-3,20-dione-(or 17α,21-diol-3,11,20-trione) 21-acetates are converted to the free 21-ols.

If an 11β-hydroxy steroid is used as the starting material, the resulting 11β-hydroxy products may be oxidized to the corresponding 11-keto derivatives by treating the products with an oxidizing agent such as chromic oxide.

EXAMPLE 3

9α-Fluoro-Δ$^{4,6}$-Pregnadiene-11β,17α,21-Triol-3,20-Dione (XXI)

To a solution of 250 mg. of 6,7-dehydro-9α-fluorohydrocortisone acetate (XVII) in 7.5 ml. of methanol is added under nitrogen a solution of 1.2 ml. of a 10% aqueous potassium carbonate solution, which has been boiled for 1 minute and cooled under nitrogen. After 25 minutes at room temperature 0.25 ml. of glacial acetic acid is added to the mixture and the methanol removed in vacuo. The residue is taken up in ethyl acetate, washed with water and the ethyl acetate solution dried over sodium sulfate. Evaporation of the solvent leaves a crystalline residue consisting essentially of 6,7-dehydro-9α-fluorohydrocortisone (XXI). After recrystallization from 95% ethanol the substance has the following properties: M.P. about 257–259° (dec.); $[\alpha]_D^{23}$ +101° (c., 0.45 in 95% ethanol);

$\lambda_{max.}^{alc.}$ 281 mμ (ε=25,600); $\lambda_{max.}^{Nujol}$ 2.95μ (OH), 5.85μ (20-keto), 6.10μ, 6.19μ, 6.31μ (Δ$^{4,6}$-3-ketone)

Analysis.—Calcd. for $C_{21}H_{27}O_5F$ (378.43): C, 66.65; H, 7.19. Found: C, 66.30; H, 7.00.

In a similar manner, by substituting the 21-acetoxy derivatives of 9α-chloro-Δ$^{4,6}$-pregnadiene-11β,17α-diol-3,20-dione (XVIII), 9α-fluoro-Δ$^{4,6}$-pregnadiene-17α-ol-3,11,20-trione (XIX) and 9α-chloro-Δ$^{4,6}$-pregnadiene-17α-ol-3,11,20-trione (XX) for the 6,7-dehydro-9α-fluorohydrocortisone acetate in Example 3, 9α-chloro-Δ$^{4,6}$-pregnadiene-11β,17α,21-triol-3,20-dione (XXII), 9α-fluoro-Δ$^{4,6}$-pregnadiene-17α,21-diol-3,11,20-trione (XXIII) and 9α-chloro-Δ$^{4,6}$-pregnadiene-17α,21-diol-3,11,20-trione (XXIV) are prepared respectively.

EXAMPLE 4

9α-Fluoro-Δ$^{4,6}$-Pregnadiene-11β,17α-Diol-3,20-Dione (XXXIII)

(a) PREPARATION OF 9α-FLUORO-Δ$^{4,6}$-PREGNADIENE-11β,17α,21-TRIOL-3,20-DIONE 21-MESYLATE (XXV)

To a solution of 175 mg. 6,7-dehydro-9α-fluorohydrocortisone (XXI) in 4 ml. of dry pyridine is added at 0° a solution of 0.1 ml. of methanesulfonyl chloride in 1 ml. of chloroform. After 2¾ hours at 0° ice water is added and the mixture extracted with chloroform. Extraction of the chloroform solution with dilute sulfuric acid, water, sodium bicarbonate solution and water followed by evaporation of the chloroform in vacuo furnishes a residue consisting of essentially pure 6,7-dehydro-9α-fluorohydrocortisone 21-mesylate (XXV). Recrystallization from 95% ethanol yields the pure mesylate having the following properties: M.P. about 237–238° (dec.); $[\alpha]_D^{23}$ +94° (c., 0.21 in 95% alcohol);

$\lambda_{max.}^{alc.}$ 281 mμ (ε=27,500); $\lambda_{max.}^{Nujol}$ 2.85μ, 2.98μ (OH), 5.76μ (20-keto), 6.05μ, 6.10μ, 6.18, 6.30μ (Δ$^{4,6}$-3-ketone)

Analysis.—Calcd. for $C_{22}H_{29}O_7FS$ (456.51): C, 57.78; H, 6.40; S, 7.02. Found: C, 58.19; H, 6.05; S, 7.54.

In a similar manner, by substituting 9α-chloro-Δ$^{4,6}$-pregnadiene-11β,17α,21-triol-3,20-dione, 9α-fluoro-Δ$^{4,6}$-pregnadiene-17α,21-diol-3,11,20-trione and 9α-chloro-Δ$^{4,6}$-pregnadiene-17α,21-diol-3,11,20-trione for the 9α-fluoro-Δ$^{4,6}$-pregnadiene-11β,17α,21-triol-3,20-dione, the corresponding 21-mesylates (XXVI to XXVIII) are prepared.

Furthermore, the procedure of Example 4(a) is operative in the conversion of all 9α-fluoro (or chloro)-21-hydroxy-Δ$^{4,6}$-pregnadienes to the corresponding 21-mesylate derivatives.

(b) PREPARATION OF 9α-FLUORO-21-IODO-Δ$^{4,6}$-PREGNADIENE-11β,17α-DIOL-3,20-DIONE (XXIX)

A solution of 190 mg. of 6,7-dehydro-9α-fluorohydrocortisone 21-mesylate (XXV) and 723 mg. of sodium iodide in 7.2 ml. of acetone is refluxed for 10 minutes. The reaction mixture is diluted with water until all the sodium mesylate has dissolved. The solution is allowed to cool slowly. After concentration in vacuo the crystals are filtered and recrystallized from ethanol. Pure 9α-fluoro-21-iodo-Δ$^{4,6}$-pregnadiene-11β,17α-diol-3,20-dione (XXIX) has the following properties: M.P. about 225° (dec.); $[\alpha]_D^{23}$ +110° (c., 0.33 in absolute alcohol);

$\lambda_{max.}^{Nujol}$ 2.97μ (OH), 5.85μ (20-keto), 6.08μ, 6.18μ, 6.31μ (Δ$^{4,6}$-3-ketone)

Analysis.—Calcd. for $C_{21}H_{26}O_4FI$ (488.34): C, 51.65; H, 5.37; I, 25.99. Found: C, 51.93; H, 5.68; I, 26.58.

In a similar manner, by substituting the 21-mesyloxy derivatives of 9α-chloro-Δ$^{4,6}$-pregnadiene-11β,17α-diol-3,20-dione (XXVI), 9α-fluoro-Δ$^{4,6}$-pregnadiene-17α-ol-3,11,20-trione (XXVII) and 9α-chloro-Δ$^{4,6}$-pregnadiene-17α-ol-3,11,20-trione (XXVIII) for the 9α-fluoro-Δ$^{4,6}$-pregnadiene-11β,17α,21-triol-3,20-dione 21-mesylate of Example 4(b), the corresponding 21-iodo derivatives (XXX to XXXII) are produced.

(c) PREPARATION OF 9α-FLUORO-Δ$^{4,6}$-PREGNADIENE-11β,17α-DIOL-3,20-DIONE (XXXIII)

To a solution of 140 mg. of 9α-fluoro-21-iodo-Δ$^{4,6}$-pregnadiene-11β,17α-diol-3,20-dione (XXIX) in 1.4 ml. of pure dioxane is added 1.4 ml. of 5% aqueous sodium bisulfite solution. The mixture is heated on the steam bath for ½ hour and during this process crystals appear throughout the solution. After the addition of water, the mixture is cooled and the crystals of 9α-fluoro-Δ$^{4,6}$-pregnadiene-11β,17α-diol-3,20-dione (XXXIII) are filtered off and washed with water. Recrystallization of the crude crystals (about 92 mg.) from 95% ethanol furnishes the pure compound having the following properties: M.P. about 294–296° (dec.); $[\alpha]_D^{23}$ +112° (c., 0.33 in dioxane);

$\lambda_{max.}^{alc.}$ 281 mμ (ε=26,000); $\lambda_{max.}^{Nujol}$ 2.99μ (OH), 5.87μ (20-keto), 6.10μ, 6.18μ, 6.30μ (Δ$^{4,6}$-3-ketone)

Analysis.—Calcd. for $C_{21}H_{27}O_4F$ (362.43): C, 69.59; H, 7.51. Found: C, 69.66; H, 7.48.

In the same manner as Example 4(c), the 21-iodo derivatives of 9α-chloro-Δ$^{4,6}$-pregnadiene-11β,17α-diol-3,20-dione (XXX), 9α-fluoro-Δ$^{4,6}$-pregnadiene-17α-ol-3,11,20-trione (XXXI) and 9α-chloro-Δ$^{4,6}$-pregnadiene-17α-ol-3,11,20-trione (XXXII) are converted to their respective 21-unsubstituted derivatives (XXXIV to XXXVI).

Furthermore, the procedures of Example 4 are also operative in the conversion of 9α-fluoro (or chloro)-Δ$^{4,6}$- pregnadiene-11β,21-diol-3,20-dione and 9α-fluoro (or chloro)-Δ⁴,⁶-pregnadiene-21-ol-3,11,20-trione to their corresponding 21-unsubstituted derivatives.

The 9α-bromo and 9α-iodo-Δ⁴,⁶-pregnadiene steroids of this invention are preferably prepared indirectly from the corresponding 9α-chloro-11β-hydroxy-Δ⁴,⁶-pregnadiene derivatives by way of the 9β,11β-oxido intermediates of this invention, the preferred 9β,11β-oxido intermediates being those of the general formula

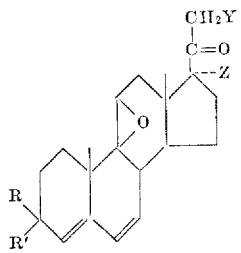

wherein R, R', Z and Y are as hereinbefore defined. Thus the 9α-chloro-11β-hydroxy steroid is reacted with a salt of a strong base and a weak acid, such as an alkali metal carbonate (e.g., potassium carbonate) or an alkali metal alkoxide (e.g., sodium methoxide), and the corresponding 9β,11β-oxido compound thus formed is then reacted with a hydrogen halide (e.g., hydrobromic acid and hydroiodic acid) to form the corresponding 9α-halo-11β-hydroxy derivative. The series of steps can be represented by the following schematic analysis and examples:

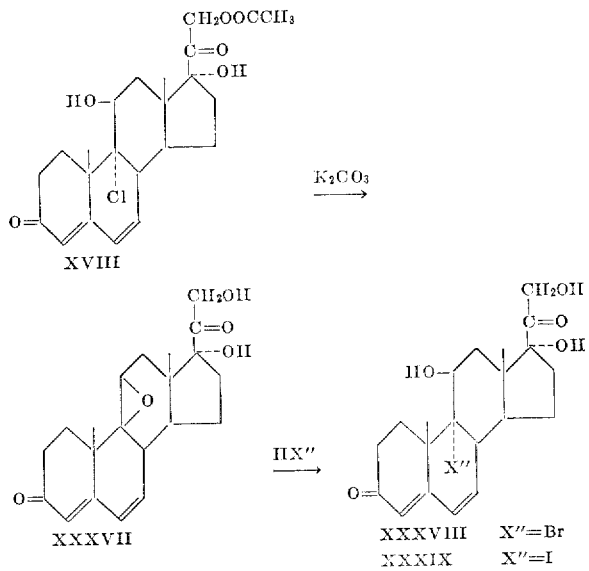

It should be noted that if the 9α-chloro steroid has an esterified hydroxy group in the 21-position, this group is hydrolyzed, and a free 21-ol is produced. The 21-hydroxy group can, however, later be esterified by treatment with the desired acyl halide or acid anhydride to form either a 21-esterified 9β,11β-oxide or 21-esterified 9α-halo derivative.

EXAMPLE 5

*9β,11β-Oxido-Δ⁴,⁶-Pregnadiene-17α,21-Diol-3,20-Dione (XXXVII)*

To a solution of 100 mg. of 9α-chloro-Δ⁴,⁶-pregnadiene-11β,17α-21-triol-3,20-dione 21-acetate (XVIII) in 10 ml. of methanol is added a solution of 100 mg. of potassium carbonate in 0.5 ml. of oxygen-free water. Nitrogen is passed through the resulting solution for 5 minutes, and the mixture is allowed to remain at room temperature for three hours. Acetic acid is added to neutralize the carbonate, and after the addition of 5 ml. water, the methanol is removed in vacuo. The remaining aqueous suspension is extracted with chloroform, the chloroform extract washed with water and dried over sodium sulfate. Evaporation of the solvent leaves a residue of the desired 9β,11β-epoxide (XXXVII).

In a similar manner, by using 9α-chloro-Δ⁴,⁶-pregnadiene 11β,21-diol-3,20-dione 21-acetate and 9α-chloro-Δ⁴,⁶-pregnadiene-11β-ol-3,20-dione as a starting material, 9β,11β-oxido-Δ⁴,⁶-pregnadiene-21-ol-3,20-dione and 9β,11β-oxido-Δ⁴,⁶-pregnadiene-3,20-dione are formed, respectively.

EXAMPLE 6

*9α-Bromo-Δ⁴,⁶-Pregnadiene-11β,17α,21-Triol-3,20-Dione (XXXVIII)*

To a solution of 25 mg. of 9β,11β-oxido-Δ⁴,⁶-pregnadiene-17α,21-diol-3,20-dione (XXXVII) in 1 ml. of chloroform is added with shaking at room temperature 0.04 ml. 30% hydrobromic acid in glacial acetic acid. After 10 minutes, 10 ml. of chloroform is added, and the mixture is extracted with dilute sodium bicarbonate and with water. The chloroform solution is dried over sodium sulfate, and evaporated to dryness in vacuo; and the residue, 9α-bromo-Δ⁴,⁶-pregnadiene-11β,17α,21-triol-3,20-dione, is crystallized from acetone.

In a similar manner, by substituting 60% aqueous hydroiodic acid for hydrobromic acid in Example 6, the corresponding 9α-iodo compound (XXXIX) is formed.

Similarly, all other 9β,11β-oxido steroids of this invention can be converted to the corresponding 9α-bromo and 9α-iodo derivatives by the method of Example 6. Furthermore, the 9α-bromo and 9α-iodo, 11β-hydroxy derivatives obtained can be oxidized to the corresponding 9α-bromo or 9α-iodo 11-keto derivatives by reaction with chromic acid.

Another utilizable process for preparing the steroids of this invention comprises brominating an 11α-hydroxy steroid of the allopregnane series (after hydrogenating the steroid, if there is unsaturation in the 4,5-position, as for example by means of hydrogen in the presence of a palladium catalyst with or without a carrier such as barium sulfate, and separating the allopregnane isomer from the coproduced pregnane derivative) to form a 2,4-dibromo derivative. Suitable starting steroids for this process include 11α-hydroxyprogesterone, 11α,17α-dihydroxyprogesterone, the 21-esters (e.g. 21-acetate) of epicorticosterone, and the 21-esters (e.g. 21-acetate) of Δ⁴-pregnene-11α,17α,21-triol-3,20-dione (also known as epi F), as well as the 4,5-dihydro derivatives of each of these. These bromo derivatives are then dehydrobrominated by heating with a base, such as collidine with or without a lithium halide salt, or with a lithium halide salt in a lower fatty acid amide (e.g. dimethylformamide) to form a mixture of the corresponding Δ¹,⁴ and Δ⁴,⁶-pregnadiene derivatives which are separated chromatographically. These Δ⁴,⁶-11α-hydroxy derivatives are then subjected to the conversion disclosed for 11α-hydroxy derivatives in U.S. Patent No. 2,852,511 to obtain the compounds of this invention. Thus, the 11α-hydroxy 4,6-pregnadienes are reacted with a sulfonyl halide, such as tosyl chloride, to form the corresponding 11α-sulfonyloxy (e.g. 11α-tosyloxy) derivatives, which in turn are heated, for example, with sodium acetate and acetic acid, to form the corresponding Δ⁴,⁶,⁹⁽¹¹⁾-pregnatriene derivatives. These derivatives are then hydroxybrominated, with say N-bromoacetamide, to form the corresponding 9α-bromo-11β-hydroxy derivatives, which in turn can be oxidized with chromic oxide to form the corresponding 9α-bromo-11-keto derivatives, or can be converted with potassium acetate to the corresponding 9β,11β-oxido derivatives. These 9β,11β-oxido derivatives can then be reacted with a hydrogen halide, such as hydrofluoric acid, hydrochloric acid, or hydroiodic acid to form the corresponding 9α-halo-11β-hydroxy derivatives, and these derivatives can then be oxidized with chromic oxide to the corresponding 9α-halo-11-keto derivatives.

The preparation of 11α-hydroxy-Δ⁴,⁶-pregnadienes utilizable in the foregoing process of this invention is illustrated by the following example, wherein Δ⁴,⁶-pregnadiene-11α,17α,21-triol-3,20-dione 21-acetate is prepared from Δ⁴-pregnene-11α,17α,21-triol-3,20-dione.

EXAMPLE 7

A solution of 8.0 g. of Δ⁴-pregnene-11α,17α,21-triol-3,20-dione in 500 ml. of 95% alcohol is shaken in an atmosphere of hydrogen at room temperature and ordinary pressure in the presence of 1 g. of a 5% Pd on charcoal catalyst. After the absorption of 630 ml. of hydrogen, the reduction comes to a standstill. The catalyst is filtered off and the solvent removed completely in high vacuum. The mixture of pregnane-11α,17α,21-triol-3,20-dione and the corresponding allopregnane is separated chromatographically as described in U.S. Patent No. 2,659,744.

720 mg. of the allopregnane-11α,17α,21-triol-3,20-dione thus recovered is acetylated in the 21-position only by dissolving it in 5 ml. of dry pyridine and adding to the solution 210 mg. of acetic anhydride. After 18 hours at room temperature, the mixture is diluted with water and chloroform. The chloroform extract is washed with water, 1 N hydrohcloric acid, sodium bicarbonate and again with water, dried over sodium sulfate and the solvent removed in vacuo.

The resulting allopregnane-11α,17α,21-triol-3,20-dione 21-acetate is dissolved in 40 ml. of glacial acetic acid and to the solution is added slowly with stirring 7.6 ml. of a solution of bromine in acetic acid (80 mg. Br₂/ml.). When all the bromine has been adsorbed, 370 mg. of solid potassium acetate is added and the mixture concentrated to a small volume in vacuo. Water and chloroform is added and after separation of the layers, the chloroform extract is washed with sodium bicarbonate solution and with water, dried over sodium sulfate and evaporated to dryness in vacuo. The residue, consisting essentially of 2,4-dibromoallopregnane-11α,17α,21-triol-3,20-dione 21-acetate, is dissolved in 10 ml. of collidine and the resulting solution boiled under reflux for ¾ hour in an atmosphere of nitrogen. The mixture is then treated with chloroform and sufficient 1 N hydrochloric acid to remove all the collidine from the chloroform solution and the latter washed with sodium bicarbonate solution and water. Evaporation of the solvent in vacuo leaves a residue, from which the Δ¹,⁴-pregnadiene-11α,17α,21-triol-3,20-dione 21-acetate is separated by chromatography on 12 g. of sulfuric acid-washed alumina. For this purpose, the residue is dissolved in 4 ml. of chloroform and 12 ml. of benzene, poured on the column and the latter eluted with a solvent mixture containing 1 volume of chloroform and three volumes of benzene, which removes some amorphous material. When the eluate is changed to chloroform Δ⁴,⁶-pregnadiene-11α,17α,21-triol-3,20-dione 21-acetate is eluted, followed by Δ¹,⁴-pregnadiene-11α,17α,21-triol-3,20-dione 21-acetate.

The invention may be variously otherwise embodied within the scope of the appended claims.

What is claimed is:

1. A steroid of the pregnadiene series, unsaturated in the 4,5 and 6,7 positions and having a 9α-halo group, oxo groups in the 3- and 20-positions, and a substituent selected from the class consisting of β-hydroxy and keto in the 11-position.

2. A steroid of the formula

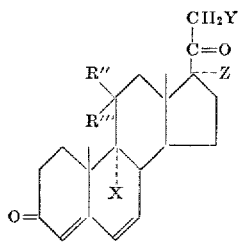

wherein individually R″ is hydrogen, R‴ is β-hydroxy and together R″ and R‴ is keto; X is an α-halogen group; Z is selected from the group consisting of hydrogen and α-hydroxy; and Y is selected from the group consisting of hydrogen, hydroxy and the acyloxy of a hydrocarbon carboxylic acid of less than ten carbon atoms.

3. A compound selected from the class consisting of 9α-halo-Δ⁴,⁶-pregnadiene-11β,17α,21-triol-3,20-dione and 21-esters thereof with hydrocarbon carboxylic acids of less than ten carbon atoms.

4. A compound selected from the class consisting of 9α-halo-Δ⁴,⁶-pregnadiene-17α,21-diol-3,11,20 - trione and 21-esters thereof with hydrocarbon carboxylic acids of less than ten carbon atoms.

5. 9α-fluoro-Δ⁴,⁶-3,11,20-triketo - 17α,21 - dihydroxy pregnadiene 21-acetate

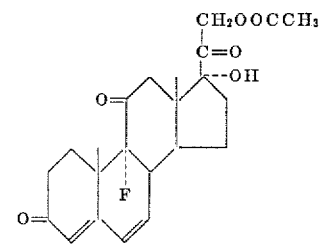

6. 9α-fluoro-Δ⁴,⁶-3,20-diketo - 11β,17α-21 - trihydroxy-pregnadiene 21-acetate

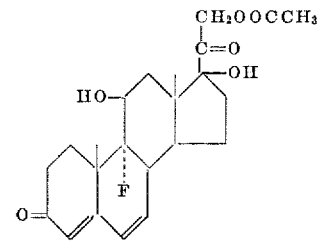

7. 9α-halo-Δ⁴,⁶-pregnadiene - 11β,21 - diol-3,20-dione, wherein the halogen has an atomic weight less than 36.

8. 9α-halo-Δ⁴,⁶-pregnadiene - 21 - ol-3,11,20 - trione, wherein the halogen has an atomic weight less than 36.

9. 9α-halo-Δ⁴,⁶-pregnadiene - 17α - ol-3,11,20-trione, wherein the halogen has an atomic weight less than 36.

10. 9α-halo-Δ⁴,⁶-pregnadiene-11β,17α-diol-3,20 - dione, wherein the halogen has an atomic weight less than 36.

11. A steroid of the pregnadiene series, unsaturated in the 4,5 and 6,7 positions, and having a 9β,11β-oxido group and oxo groups in the 3- and 20-positions.

12. A steroid of the formula

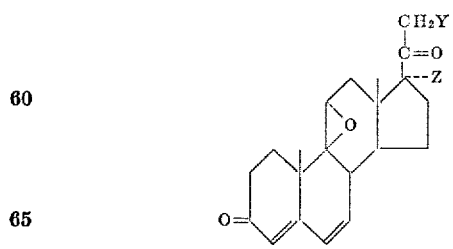

wherein Z is selected from the group consisting of hydrogen and α-hydroxy; and Y is selected from the group consisting of hydrogen, hydroxy and the acyloxy of a hydrocarbon carboxylic acid of less than ten carbon atoms.

13. A compound selected from the class consisting of 9β,11β-oxido-Δ⁴,⁶-pregnadiene-17α,21 - diol - 3,20-dione and 21-esters thereof with hydrocarbon carboxylic acids of less than ten carbon atoms.

14. 9β,11β-oxido-Δ$^{4,6}$-pregnadiene-17α-ol-3,20-dione.
15. 9β,11β-oxido-Δ$^{4,6}$-pregnadiene-21-ol-3,20-dione.
16. A process for preparing a steroid of the pregnadiene series unsaturated in the 4,5 and 6,7 positions, and having a 9α-halo group and a substituent selected from the class consisting of β-hydroxy and keto in the 11-position, which comprises reacting the corresponding saturated allopregnane derivative with two moles of bromine per mole of steroid, and dehydrobrominating the compound thus formed.

References Cited in the file of this patent

Fieser and Fieser; Natural Products Related to Phenanthrene, 3rd ed. (1959), pages 335-336, Reinhold Publishing Corp., New York city.

UNITED STATES PATENT OFFICE
CERTIFICATE OF CORRECTION

Patent No. 3,105,832            October 1, 1963

Josef Fried

It is hereby certified that error appears in the above numbered patent requiring correction and that the said Letters Patent should read as corrected below.

Column 3, lines 62 to 72, the formula should appear as shown below instead of as in the patent:

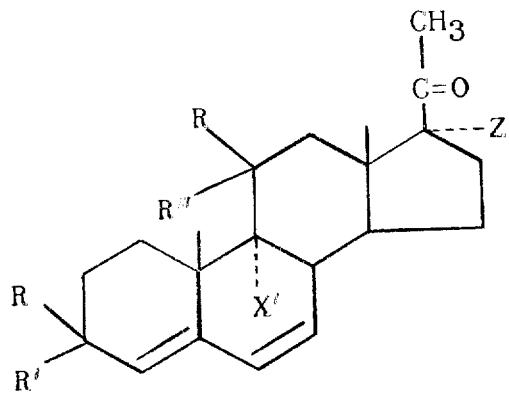

columns 5 and 6, below the second formula, for "VII R'+R''=(=O); X=Cl" read -- VII R'+R''=(=O); X=F --; same columns 5 and 6, below the fifth formula, for "XVIII R'=H'; R''=β-OH; X=Cl" read -- XVIII R''=H; R'''=β-OH; X=Cl --.

Signed and sealed this 12th day of May 1964.

(SEAL)
Attest:

ERNEST W. SWIDER
Attesting Officer

EDWARD J. BRENNER
Commissioner of Patents